UNITED STATES PATENT OFFICE.

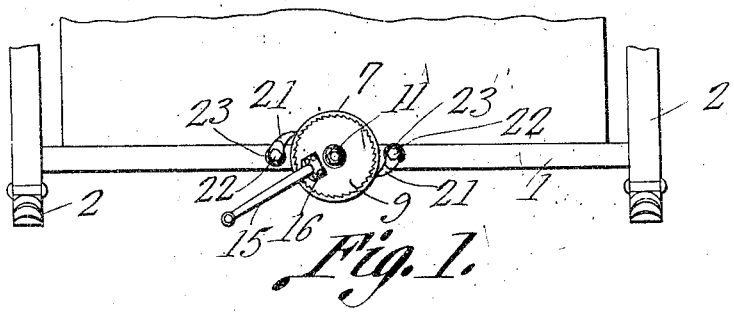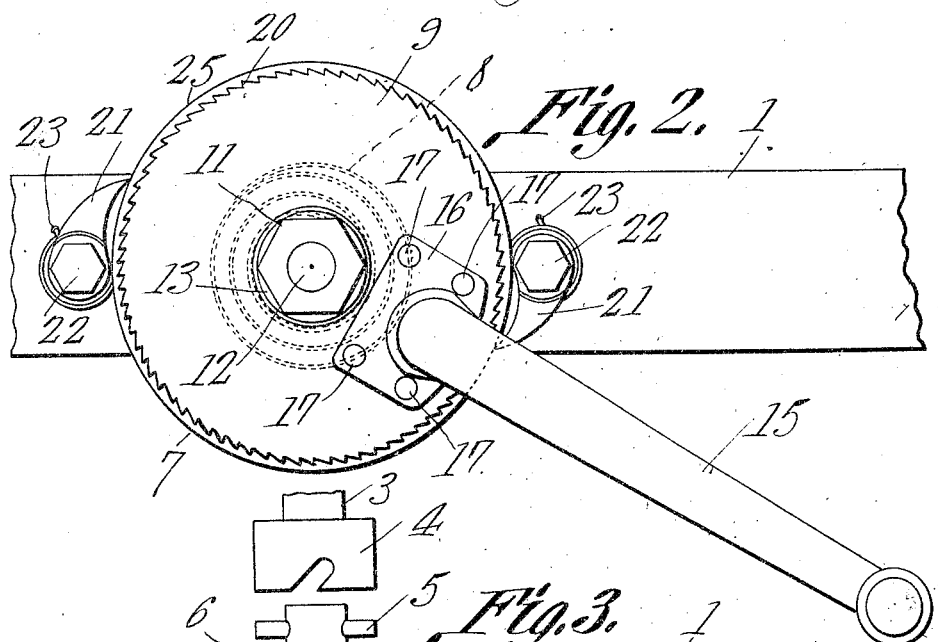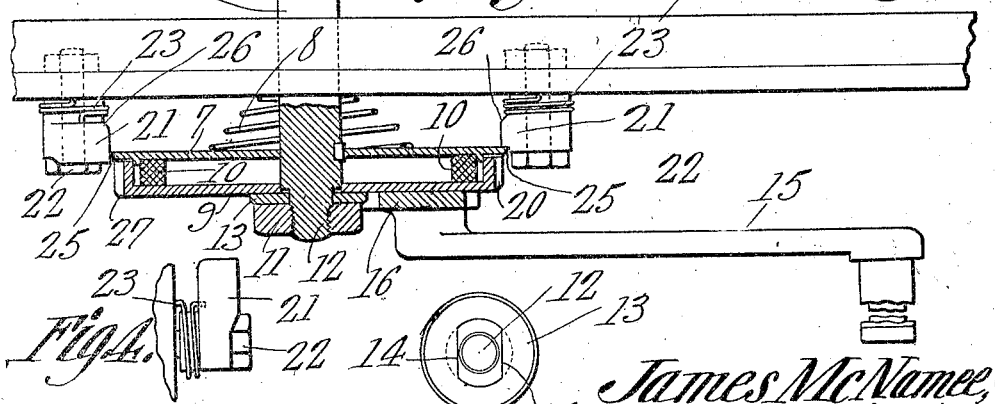

JAMES McNAMEE, OF AMSTERDAM, NEW YORK.

STARTING DEVICE.

1,053,195.  Specification of Letters Patent.  Patented Feb. 18, 1913.

Application filed November 16, 1910. Serial No. 592,723.

*To all whom it may concern:*

Be it known that I, JAMES McNAMEE, a citizen of the United States, residing at Amsterdam, in the county of Montgomery and State of New York, have invented a new and useful Starting Device, of which the following is a specification.

This invention relates to starting devices for compression engines, such as are used on motor cars and the like.

A starting device of the character referred to forms the subject matter of my co-pending application Serial No. 577,254, filed Aug. 15, 1910.

The principal object of the present invention is to permit the motorist to crank the engine without danger from what is known as the back lash of the engine.

With the foregoing and other objects in view as will appear as the description proceeds, the invention consists in the combination and arrangement of parts and in the details of construction hereinafter described and claimed, it being understood that changes in the embodiment of the invention herein claimed can be made within the scope of what is claimed without departing from the spirit of the invention.

In the accompanying drawings forming a part of this specification: Figure 1 is a front elevation of a portion of the frame of a motor vehicle equipped with a starting device constructed in accordance with the present invention. Fig. 2 is an enlarged view of the crank handle and connected parts of the starting mechanism. Fig. 3 is a horizontal section partly in plan through the construction illustrated in Fig. 2. Fig. 4 is a detail view of one of the spring operated pawls which are adapted to be automatically thrown out of engagement with the crank disk, when the engine starts. Fig. 5 is a detail view of the washer which is keyed on the stub shaft for holding the friction disks.

Like reference numerals indicate corresponding parts in the different figures of the drawings.

The reference numeral 1 indicates a portion of the frame of a motor vehicle and 2—2 the springs thereof.

The numeral 3 in Fig. 3 indicates the main shaft of the engine on the forward end of which is located a clutch member 4 adapted to be detachably engaged by a clutch member 5 mounted on a stub shaft 6 which is longitudinally movable toward and from the shaft 3 through the frame 1 of the motor car. The stub shaft 6 has formed integral therewith or otherwise fixed rigidly thereon an enlarged friction disk 7.

For the purpose of holding the clutch member 5 normally out of engagement with the clutch member 4, the frusto-conical coil spring 8 is interposed between the friction disk 7 and the frame member 1. The coil spring 8 presses against the friction disk 7 and holds the clutch member 5 in its foremost position. When the friction disk 7 together with the stub shaft 6 is pushed rearwardly to engage the clutch member 5 with the clutch member 4 as will hereinafter appear the conical spring 8 flattens down into volute form so that the friction disk 7 can be pushed backward practically to the frame member 1, said disk being separated from said spring member by only one thickness of the wire composing the spring 8.

The means for imparting rotation to the friction disk 7 to be transmitted through the shaft 6 to the main shaft 3 preferably includes a friction cup 9 which rotatably or loosely surrounds the shaft 6. Annular friction material 10 of any suitable form is interposed between the friction disks or members 7 and 9. The friction disk or member 9 is forced toward the friction disk 7 by means such as a nut 11 which is threaded onto the reduced end 12 of the stub shaft 6. A washer 13 is interposed between the nut 11 and the friction disk 9. The washer 13 as shown best in Fig. 5 is provided with an elongated slot, and shaft 6 is flattened on opposite sides thereof as shown at 14, to fit the slot in the washer 13, whereby the washer 13 is securely keyed on the shaft 6 and rotates therewith. The amount of friction between the crank disk 9 and the disk 7 is determined by tightening the nut 11 which forces the washer 13 against the disk 9, said disk 9 being thereby forced toward the disk 7. Friction, of course, is produced between the disks 7 and 9, through the medium of the friction material 10, and between the washer 13 and the disk 9.

For the purpose of rotating the friction disk 9 to start the engine, means such as the crank handle 15 is employed, said crank handle 15 having at the inner end thereof a plate 16 which is bolted or otherwise secured at 17 to the peripheral portion of the disk 9. By rotating the crank handle 15, the friction disk 9 causes the friction disk 7 and stub shaft 6 to rotate, and if the clutch member 5 be properly engaged with the clutch member 4 the engine will be started.

For the purpose of preventing the crank handle 15 from lashing backward in the event that the engine should back-fire, the following mechanism is employed: The friction disk 9 on the periphery thereof is formed with a plurality of ratchet teeth 20 which are engaged, when the engine is being started, by a pair of pawls 21—21, each pivoted upon a stud 22 mounted on the machine frame 1 and having a spring 23 for forcing it into engagement with the ratchet teeth 20.

When the friction disks 7 and 9 are in their forward or inoperative position so that the clutch members 4 and 5 are disengaged from each other, the pawls 21 bear against the periphery 25 of the inner friction disk 7 and are thereby held out of engagement with the ratchet teeth 20, the friction disk 7 as shown clearly in Figs. 2 and 3, being larger in diameter than the series of ratchet teeth 20 for this purpose. The inner corners 26 of the pawls 21 are rounded or beveled, as shown in Figs. 3 and 4, and the outer portions of the periphery 25 of the disk 7 are beveled as indicated at 27. These beveled portions 25 and 26 serve to permit the outward movement of the friction disk 7 when the clutch members 4 and 5 become disengaged after the engine has started, to force the pawls 21 outward into the position shown in Fig. 2, thereby becoming disengaged from the ratchet teeth 20.

Constructed as described, the operation of the starting device is as follows:—When the parts are in the position illustrated in Fig. 3, the clutch members 4 and 5 are, of course separated. If it be desired to crank the engine, the crank handle 15 is engaged in the usual manner and is forced rearwardly. The friction disks 7 and 9 are thus pushed backward toward the frame member 1, the spring 8 flattening down, as previously described, until the clutch 5 is engaged with the clutch 4. As soon as the friction disk 7 has been pushed rearwardly to the foremost end of the frame, the periphery 25 thereof becomes disengaged from the two pawls 21 and the spring 23 of these pawls forces them inward into engagement with the ratchet teeth 20. When the parts are thus positioned, if the crank 15 be rotated, the rotation thereof will be transmitted through the friction disk 9 into the friction disk 7, and the shaft 6 into the engine. If the engine starts forward in the normal manner, the clutch member 5 rides out of the clutch member 4 and throws the starting device forward whereby the friction disk separates or moves the pawls 21 away from the ratchet teeth 20. If, however, while the clutch members 4 and 5 are engaged with each other, in the operation of starting the engine, the engine should back-fire, the pawls 21 by reason of their engagement with the ratchet teeth 20 would prevent the back lash of the engine from being transmitted to the crank handle 15. This back lash, however, would be permitted by reason of the fact that the friction disk 7 and the friction washer 13 would rotate backward with relation to the friction disk 9.

The device of the present invention while simple, strong and durable in construction, is thoroughly practical and efficient in operation.

What is claimed as new is:—

1. In a starting device, the combination with an engine shaft having a clutch member, a second clutch member adapted to engage the first, a friction disk connected with said second clutch, a second friction disk frictionally connected with the first, ratchet teeth on the second disk, a pawl adapted to engage the ratchet teeth of said second disk, said first disk being larger in diameter than said second disk and being adapted when in forward position to engage the pawl, whereby to hold said pawl out of engagement with said ratchet teeth, and a crank handle connected with the second disk.

2. In a starting device, the combination with an engine frame, and a clutch member slidable therein, a friction disk fixed on said clutch member, a spring between said disk and said engine frame, a second friction disk frictionally engaging said first disk, ratchet teeth on the second disk, a spring operated pawl pivoted on said engine frame, and adapted to engage the ratchet teeth of said second disk, said first disk being larger in diameter than said second disk and being adapted when in forward position to engage the pawl, whereby to hold it out of engagement with said ratchet teeth, and a crank handle connected with the second disk.

3. In a starting device, the combination with an engine frame, and a stub shaft slidable therein, said stub shaft having a clutch member thereon, of a friction disk fixed on said stub shaft on the outside of said engine frame, a spring between said disk and said engine frame, a friction washer keyed on said stub shaft, a nut engaging said friction washer, a friction disk mounted loosely on said stub shaft between said friction washer and said fixed disk, and frictionally connected with said fixed disk, ratchet teeth on the periphery of said loose disk, a spring operated pawl pivoted on said engine frame, and adapted to engage the ratchet teeth of said loose disk, the inner corner of said pawl being rounded, said fixed disk being larger in diameter than said loose disk and having its periphery beveled to engage the rounded corner of the said pawl, whereby to hold it out of engagement with said ratchet teeth when said fixed disk is in its forward position, and a crank handle secured to said loose disk.

4. In a starting device, the combination with an engine frame, and a stub shaft slidable therein, said stub shaft having a clutch member thereon, of a friction disk fixed on said stub shaft on the outside of said engine frame, a cone-shaped coil spring between said disk and said engine frame, a friction washer keyed on said stub shaft, a nut engaging said friction washer, a cup-shaped friction disk mounted loosely on said stub shaft between said friction washer and said fixed disk, friction material interposed between said loose disk and said fixed disk, ratchet teeth on the periphery of said loose disk, a pair of spring operated pawls pivoted on said engine frame, and adapted to engage the ratchet teeth of said loose disk, the inner corners of said pawls being rounded, said fixed disk being larger in diameter than said loose disk and having its periphery beveled to engage the rounded corners of the said pawls, whereby to hold them automatically out of engagement with said ratchet teeth and a crank handle secured to said loose disk.

In testimony that I claim the foregoing as my own, I have hereto affixed my signature in the presence of two witnesses.

JAMES McNAMEE.

Witnesses:
DANIEL V. McNAMEE.
A. B. MILLER.